United States Patent
Rubens et al.

(10) Patent No.: US 10,906,108 B2
(45) Date of Patent: Feb. 2, 2021

(54) BLADE ACCESSORY WITH GUIDE

(71) Applicants: Robert Bosch Tool Corporation, Broadview, IL (US); Robert Bosch GmbH, Stuttgart (DE)

(72) Inventors: Jeremy Rubens, Palatine, IL (US); Walter Bernardi, Highland Park, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 48 days.

(21) Appl. No.: 15/961,271

(22) Filed: Apr. 24, 2018

(65) Prior Publication Data

US 2019/0321900 A1    Oct. 24, 2019

(51) Int. Cl.
  *B23D 49/10*   (2006.01)
  *B23D 61/00*   (2006.01)
  *B27B 19/00*   (2006.01)
  *B25F 3/00*    (2006.01)

(52) U.S. Cl.
  CPC ......... *B23D 49/105* (2013.01); *B23D 61/006* (2013.01); *B27B 19/006* (2013.01); *B25F 3/00* (2013.01)

(58) Field of Classification Search
  CPC ...... B23D 49/00; B23D 49/10; B23D 49/105; B23D 61/00; B23D 61/006; B27B 19/00; B27B 19/006; B27B 19/008
  See application file for complete search history.

(56) References Cited

U.S. PATENT DOCUMENTS

| | | | | |
|---|---|---|---|---|
| 1,779,474 A | * | 10/1930 | Jackson | E01B 27/14 104/13 |
| 2,872,732 A | * | 2/1959 | Arrowood | A01G 3/06 30/293 |
| 2,912,843 A | * | 11/1959 | Williams | C14B 1/16 30/272.1 |
| 3,706,474 A | * | 12/1972 | Neuenburg | B23D 57/0076 299/38.1 |
| 3,852,881 A | * | 12/1974 | Treace | B23D 61/006 30/92 |
| 4,286,383 A | * | 9/1981 | Farden | E04G 23/006 15/93.1 |
| 4,386,609 A | * | 6/1983 | Mongeon | B23D 51/10 30/339 |
| 4,461,296 A | * | 7/1984 | Hodge | B23D 61/006 30/347 |

(Continued)

*Primary Examiner* — Andrea L Wellington
*Assistant Examiner* — Richard D Crosby, Jr.
(74) *Attorney, Agent, or Firm* — Kathy K. Takeguchi; Maginot, Moore & Beck LLP (57) ABSTRACT

An accessory includes a blade, a coupling, and a guide. The blade includes a cutting edge. The coupling includes a first portion and a second portion. The first portion is attachable to and detachable from the power tool. The second portion is connected to the blade. The guide is structured to guide the blade along a work piece by interacting with a surface of the work piece as the blade moves in an advancing direction. The guide is structured to provide a locked state and an unlocked state. In the locked state, the guide is engaged with the coupling such that the guide is attached to the coupling. In the unlocked state, the guide is disengaged from the coupling such that the guide is detached from the coupling.

18 Claims, 7 Drawing Sheets

(56) References Cited

U.S. PATENT DOCUMENTS

| | | | | |
|---|---|---|---|---|
| 4,543,720 | A * | 10/1985 | Grunikiewicz | B26B 7/00 29/239 |
| 4,617,930 | A * | 10/1986 | Saunders | A61B 17/142 30/166.3 |
| 4,748,743 | A * | 6/1988 | Anderson | B26B 5/00 30/151 |
| 4,989,320 | A * | 2/1991 | Borkott | B23D 35/008 30/162 |
| 5,038,478 | A * | 8/1991 | Mezger | B26B 7/00 30/169 |
| 5,178,626 | A * | 1/1993 | Pappas | B23D 61/006 30/330 |
| 5,306,285 | A * | 4/1994 | Miller | B23D 61/006 30/355 |
| 5,309,805 | A * | 5/1994 | Mezger | B25B 27/0092 30/169 |
| 5,319,889 | A * | 6/1994 | Rudolf | B24B 55/105 451/359 |
| 5,470,272 | A * | 11/1995 | Kikuchi | B24B 23/04 451/344 |
| 5,588,213 | A * | 12/1996 | Swanberg | B23D 59/006 30/124 |
| 5,697,835 | A * | 12/1997 | Nitz | B23D 61/006 125/15 |
| 5,735,866 | A * | 4/1998 | Adams | B23D 61/006 30/339 |
| 6,865,813 | B2 * | 3/2005 | Pollak | B24B 23/04 30/166.3 |
| 6,896,679 | B2 * | 5/2005 | Danger | A61B 17/142 606/178 |
| 7,115,027 | B2 * | 10/2006 | Thomaschewski | B24B 3/36 451/349 |
| 7,744,616 | B2 * | 6/2010 | O'Donoghue | A61B 17/142 606/177 |
| 7,870,675 | B1 | 1/2011 | Della Polla | |
| 8,323,285 | B2 * | 12/2012 | Walen | A61B 17/142 29/428 |
| 8,348,951 | B2 * | 1/2013 | Walen | A61B 17/142 606/82 |
| 8,672,943 | B2 * | 3/2014 | Fisher | A61B 17/142 606/82 |
| 8,852,221 | B2 * | 10/2014 | Boykin | B27B 5/32 606/171 |
| D716,944 | S * | 11/2014 | Fisher | D24/146 |
| 8,936,597 | B2 * | 1/2015 | Wang | B27B 5/32 606/171 |
| 9,027,452 | B2 * | 5/2015 | Nagy | B23D 61/006 30/348 |
| 9,302,405 | B2 * | 4/2016 | Rubens | B27B 19/006 |
| 9,439,655 | B2 * | 9/2016 | Cosgrove | A61B 17/142 |
| 9,815,187 | B2 * | 11/2017 | Kozak | B25F 3/00 |
| 10,016,904 | B2 * | 7/2018 | Jones | B23D 59/00 |
| 10,112,294 | B2 * | 10/2018 | Fuchs | B23D 61/006 |
| 2005/0223562 | A1 * | 10/2005 | Pardue | B26B 1/04 30/161 |
| 2014/0230626 | A1 * | 8/2014 | Puzio | B26D 7/2628 83/697 |
| 2015/0000143 | A1 * | 1/2015 | Bozic | B23D 61/025 30/347 |
| 2015/0273706 | A1 * | 10/2015 | Martin | B26B 9/02 30/351 |
| 2016/0185006 | A1 * | 6/2016 | Padget | B27B 19/006 30/290 |
| 2016/0257010 | A1 * | 9/2016 | Jones | B26B 7/00 |
| 2017/0129126 | A1 * | 5/2017 | Rubens | B23D 51/10 |
| 2017/0182570 | A1 * | 6/2017 | Dvorak | B23D 51/00 |
| 2017/0297217 | A1 * | 10/2017 | Bourne | B23D 51/10 |
| 2017/0334006 | A1 * | 11/2017 | Inkster | B23D 49/16 |
| 2018/0029190 | A1 * | 2/2018 | Nagy | B24B 23/04 |
| 2018/0064448 | A1 * | 3/2018 | Mac an Tuile | B23D 51/16 |
| 2018/0200812 | A1 * | 7/2018 | Kaye, Jr. | B23D 61/006 |
| 2019/0054552 | A1 * | 2/2019 | Churchill | B23D 61/006 |
| 2019/0192170 | A1 * | 6/2019 | Nunan | A61B 17/142 |

* cited by examiner

BLADE ACCESSORY WITH GUIDE

FIELD OF THE INVENTION

This disclosure relates generally to guides, and more particularly to guides for tools.

BACKGROUND

In general, oscillating tools may accommodate various types of attachments. For example, plunge-cut blades are configured to attach to oscillating tools and perform plunge cuts on work pieces. Despite their structural configuration, some users nevertheless attempt to perform long, straight cuts with these plunge-cut blades. However, when performing long, straight cuts, these plunge-cut blades tend to sink into or pop out of the work pieces and thus tend to stall out during cutting operations in a manner that may damage at least the blades, the work pieces, or both the blades and the work pieces.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, an accessory includes a blade, a coupling, and a guide. The blade includes a cutting edge. The coupling includes a first portion and a second portion. The first portion is attachable to and detachable from the power tool. The second portion is connected to the blade. The guide is structured to guide the blade along a work piece by interacting with a surface of the work piece as the blade moves in an advancing direction. The guide is structured to provide a locked state and an unlocked state. In the locked state, the guide is engaged with the coupling such that the guide is attached to the coupling. In the unlocked state, the guide is disengaged from the coupling such that the guide is detached from the coupling.

In an example embodiment, a power tool includes a motor and an accessory. The accessory is drivable by the motor. The accessory includes a blade, a coupling, and a guide. The blade includes a cutting edge. The coupling includes a first portion and a second portion. The first portion is attachable to and detachable from the power tool. The second portion is connected to the blade. The guide is structured to guide the blade along a work piece by interacting with a surface of the work piece as the blade moves in an advancing direction. The guide is structured to provide a locked state and an unlocked state. In the locked state, the guide is engaged with the coupling such that the guide is attached to the coupling. In the unlocked state, the guide is disengaged from the coupling such that the guide is detached from the coupling.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
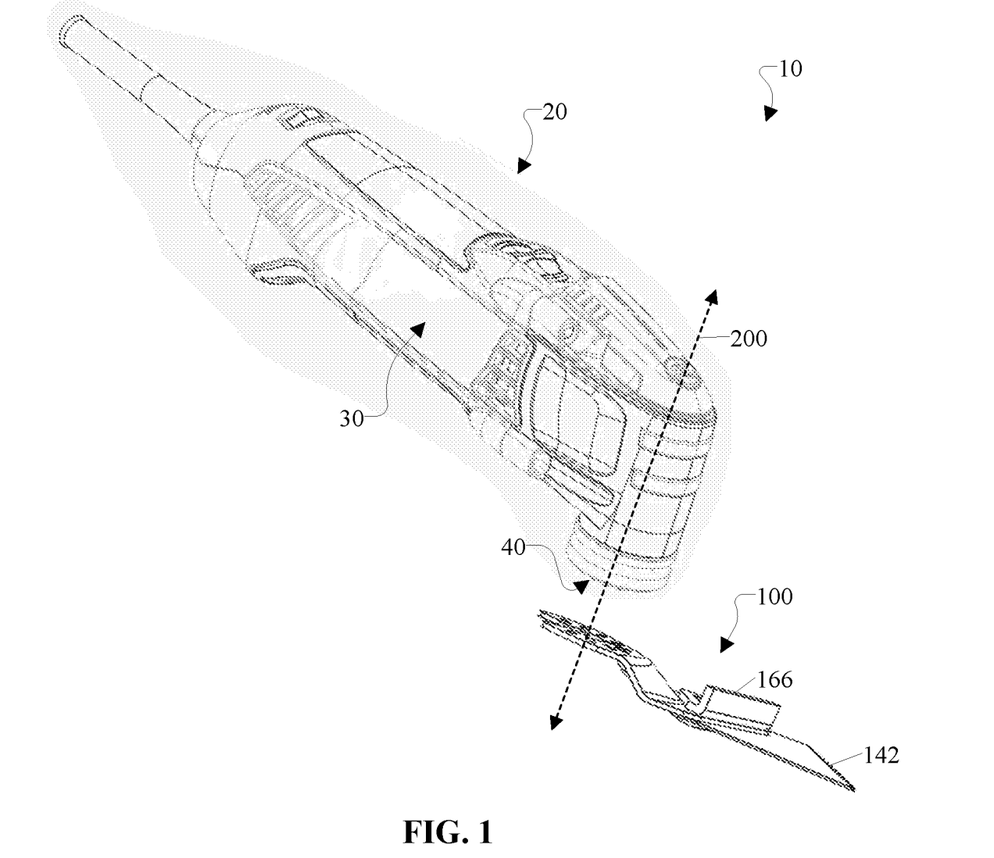
FIG. 1 is a perspective view of a blade accessory and a guide, which are detached from a power tool according to an example embodiment of this disclosure.
Figure 2:
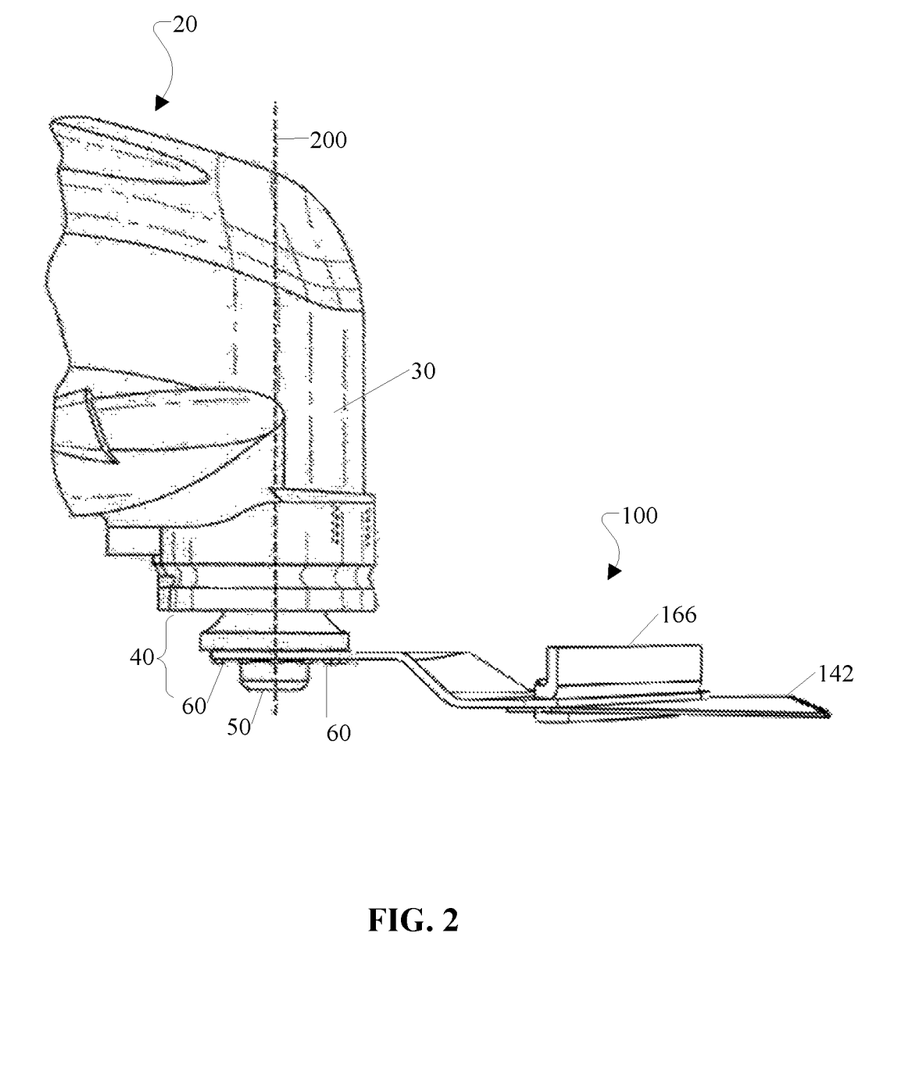
FIG. 2 is a perspective view of a blade accessory and a guide, which are attached to the power tool according to an example embodiment of this disclosure.

FIGS. 1-2 illustrate an apparatus 10 that includes a power tool, which drives an accessory to perform a particular function or operation. In this regard, for instance, the power tool is an oscillating tool 20, which is configured to drive a blade accessory 100. More specifically, in an example embodiment, the oscillating tool 20 includes at least a housing 30, a motor (disposed within the housing 30 and thus not visible in FIGS. 1-2), a driving member (disposed within the housing 30 and thus not visible in FIGS. 1-2), and an accessory holder 40. Obviously, other components (e.g., a connection to a power source, a power switch, etc.), which are known and not discussed herein, are included as a part of the oscillating tool 20. In an example embodiment, the motor is provided within the housing 30. In an example embodiment, the motor is configured to oscillate the driving member about its axis 200 at suitable frequencies (e.g., predetermined oscillations per minute). In an example embodiment, the accessory holder 40 is connected to one end of the driving member. In addition, as shown in FIG. 2, the accessory holder 40 extends outside the housing 30. In an example embodiment, the accessory holder 40 is configured to hold a removable attachment, such as an accessory or any suitable tool. In this regard, for instance, FIG. 1 illustrates an example in which the blade accessory 100 is detached or removed from the oscillating tool 20. In contrast, FIG. 2 illustrates an example in which the blade accessory 100 is attached to the oscillating tool 20 in a secure manner. More specifically, in FIG. 2, the accessory holder 40 includes a central holder 50 and a plurality of protrusions 60. With these structural features, the accessory holder 40 is configured to provide a secure connection to a corresponding part of the blade accessory 100. When attached to the accessory holder 40, the blade accessory 100 oscillates about the axis 200 when driven by the oscillating tool 20.

In an example embodiment, the accessory is configured to utilize these oscillations to perform at least one function. In this regard, depending on the type of accessory that is attached to the accessory holder 40, the oscillating tool 20 is configured to provide at least one particular action, such as sanding, grinding, shaping, polishing, etc. For example, when the accessory is the blade accessory 100, as shown in FIGS. 1-2, the oscillating tool 20 is configured to drive the blade accessory 100 and its cutting edge 142 to perform at least a cutting operation. The cutting operation can unguided or guided by a guide member 166. The cutting operation can include a plunge cut, a straight/linear cut, or any suitable cut. In this regard, the blade accessory 100 advantageously provides a user with various cutting options.

Figure 3A:
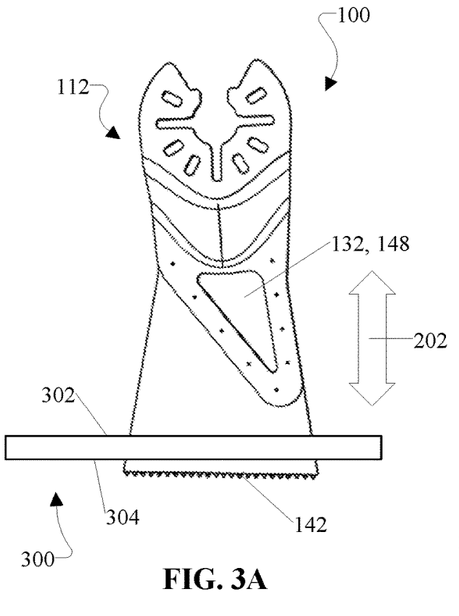
FIG. 3A is a view of a blade accessory in relation to a work piece while performing a plunge cut according to an example embodiment of this disclosure.
Figure 3B:
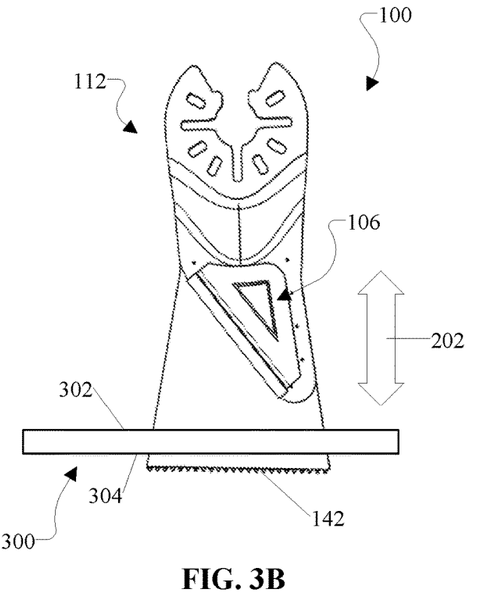
FIG. 3B is a view of a blade accessory and a guide in relation to a work piece while performing a plunge cut according to an example embodiment of this disclosure.
Figure 3C:
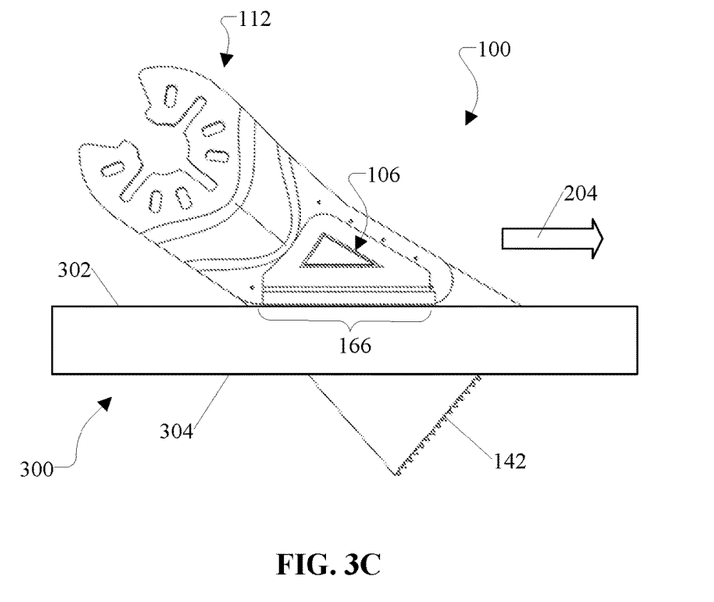
FIG. 3C is a view of a blade accessory and a guide in relation to a work piece while performing a long, straight cut according to an example embodiment of this disclosure.

FIGS. 3A, 3B, and 3C illustrate various cutting operations according to an example embodiment. Although not shown in each of FIGS. 3A, 3B, and 3C, the oscillating tool 20 is connected to a tool interface portion 112 of the blade accessory 100 during these cutting operations. More specifically, FIG. 3A illustrates an example of the blade accessory 100 performing a plunge-cut on a work piece 300 by moving the cutting edge 142 along an axis 202, which is perpendicular or substantially perpendicular to at least a first surface 302 of the work piece 300. In FIG. 3A, the blade accessory 100 is enabled to successfully perform a plunge-cut on the work piece 300 without the aid of the guide 106. FIG. 3B, on the other hand, illustrates an example of the blade accessory 100 performing a plunge-cut with the guide 106 secured to the blade accessory 100. In FIG. 3B, although the guide 106 is not being utilized, the guide 106 can be secured to the blade accessory 100 as the blade accessory 100 performs a plunge cut on a work piece 300. In this regard, FIG. 3B illustrates the blade accessory 100 moving along the axis 202 and plunging its cutting edge 142 through the work piece 300 from the first surface 302 to the second surface 304. That is, as demonstrated by FIGS. 3A and 3B, the blade accessory 100 is configured to perform a plunge cut with or without the guide 106. Meanwhile, FIG. 3C illustrates an example of the blade accessory 100 performing a long, straight/linear cut on a work piece 300 in a successful manner. More specifically, FIG. 3C illustrates the blade accessory 100 moving along an advancing direction 204 with its cutting edge 142 oriented to perform a straight/linear cut on the work piece 300. In this regard, for instance, the cutting edge 142 is at an acute angle in relation to the first surface 302 and/or the second surface 304 of the work piece 300. Also, as shown in FIG. 3C, the blade accessory 100 includes the guide 106, which includes a guide member 166 that is configured to guide the blade 104 along the work piece 300 and support the blade 104 such that the blade 104 does not sink into or pop out of the work piece 300, thereby ensuring a successful cut without damage to the blade 104, the work piece 300, or both the blade 104 and the work piece 300. In addition, the guide member 166 ensures that the cutting edge 142 is oriented at an optimal cutting angle with respect to the work piece 300.

FIGS. 4A, 4B, 4C, 5 and 6 are different views of the blade accessory 100 along with the guide 106 according to an example embodiment. In an example embodiment, the blade accessory 100 includes at least a coupling 102 and a blade 104. In an example embodiment, the coupling 102 provides an interface between the accessory holder 40 and the blade 104. More specifically, in an example embodiment, for instance, the coupling 102 includes at least a tool interface portion 112, a transition portion 114, and a blade interface portion 116. In an example embodiment, the tool interface portion 112 includes at least one mechanical structure or device that is configured to engage with the accessory holder 40 such that the coupling 102 (along with the blade 104 or both the blade 104 and the guide 106) is attachable to and detachable from the accessory holder 40. For example, in FIGS. 4A, 4B, 4C, 5 and 6, the tool interface portion 112 includes a mechanical keying portion 118, which is configured to engage with the accessory holder 40 and disengage from the accessory holder 40. In an example embodiment, the mechanical keying portion 118 is symmetrical along at least one axis, such as a longitudinal axis 210 of the blade accessory 100. In an example embodiment, the mechanical keying portion 118 includes a central opening 120, which is configured to engage with the central holder 50. Also, in FIGS. 4A-4B, the mechanical keying portion 118 includes slots 122, which include openings of various configurations, such as a first wide slot 122A and three elongated slots 122B that extend from the central opening 120, as well as some closed-shape slots 122C that are disposed around the central opening 120. In an alternative embodiment (not shown), the tool interface portion 112 includes protrusions 60, which mate with corresponding slots 122 on the accessory holder 40. In yet another alternative embodiment (not shown), the tool interface portion 112 includes both slots 122 and protrusions 60, which mate with corresponding protrusions 60 and slots 122 on the accessory holder 40. In this regard, as discussed above, the tool interface portion 112 can include any suitable mechanical structure or device that is configured to provide attachment and detachment from the oscillating tool 20.

Figure 5:
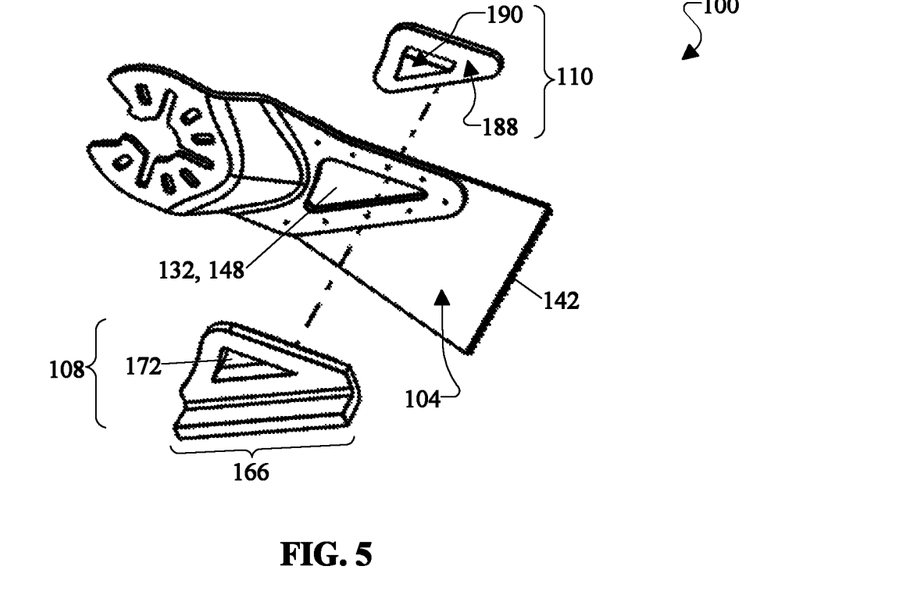
FIG. 5 is a perspective view of a blade accessory in which a guide is in an unlocked state according to an example embodiment of this disclosure.
Figure 6:
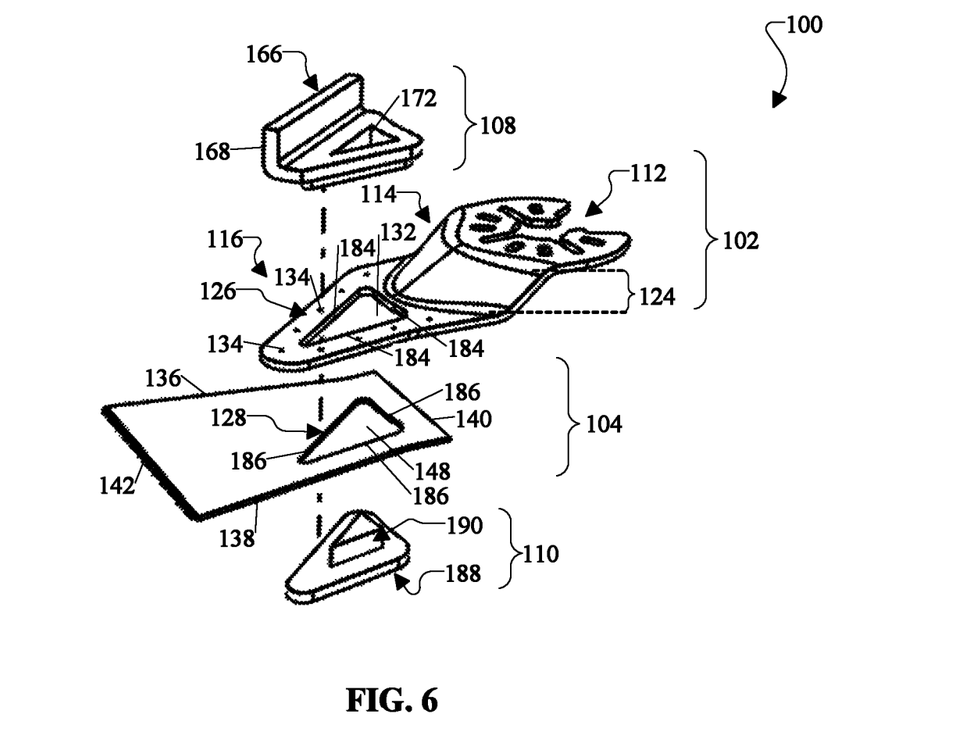
FIG. 6 is an exploded view of a blade accessory and a guide according to an example embodiment of this disclosure.

In an example embodiment, the blade interface portion 116 is structured to interface with the blade 104. In this regard, the blade interface portion 116 is the part of the coupling 102 that overlaps with the blade 104. In an example embodiment, the blade interface portion 116 includes a contact region that is integral with or affixed to the blade 104 by any suitable attachment mechanism 134 (e.g., welding, adhesive, fasteners, etc.), or any combination of attachment mechanisms 134 such that there is a strong and sturdy connection between the coupling 102 and the blade 104. Also, in an example embodiment, the blade interface portion 116 further includes an opening 132, as shown in FIGS. 3A and 5-6. In an example embodiment, the opening 132 is advantageous in reducing the mass, material, and cost of the coupling 102. The opening 132 is also structured to influence a vibrational effect of the coupling 102 or the blade accessory 100. In an example embodiment, the opening 132 is structured to receive at least a portion of the guide 106. In this regard, for instance, as shown in FIGS. 3A and 5-6, the opening 132 of the coupling 102 is configured to partly or fully overlap an opening 148 in the blade 104 so that the guide 106 is configured to mate with and connect to both the coupling 102 and the blade 104.

Figure 4A:
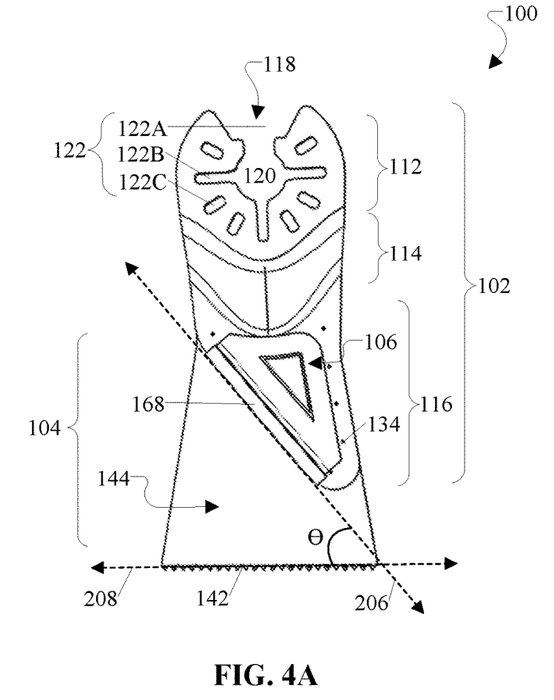
FIG. 4A is a view of a first side of a blade accessory in which a guide is in a locked state according to an example embodiment of this disclosure.
Figure 4B:
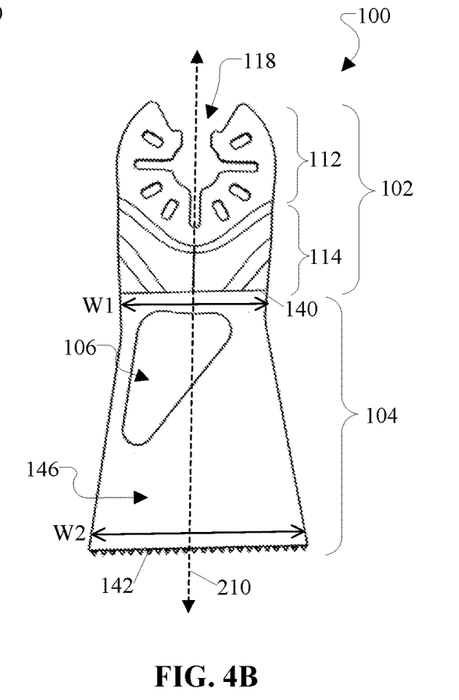
FIG. 4B is a view of a second side of the blade accessory of FIG. 4A in which the guide is in the locked state according to an example embodiment of this disclosure.
Figure 4C:
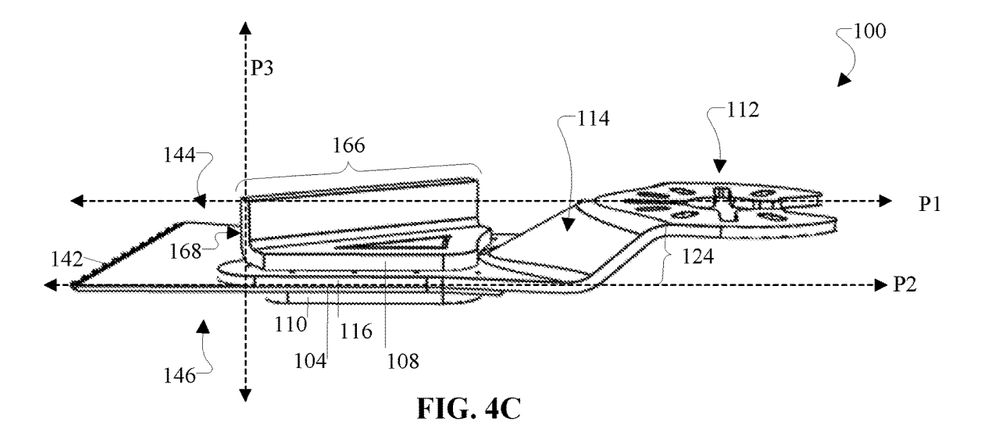
FIG. 4C is a side view of the blade accessory of FIG. 4A in which the guide is in the locked state according to an example embodiment of this disclosure.

In an example embodiment, the transition portion 114 is between the tool interface portion 112 and the blade interface portion 116. In an example embodiment, the transition portion 114 is structured to provide the coupling 102 with a smooth transition between the tool interface portion 112 and the blade interface portion 116. In an example embodiment, the transition portion 114 is structured and sized to provide sufficient clearance between the oscillating tool 20 and the blade 104. The transition portion 114 is also structured and sized to provide sufficient clearance between the oscillating tool 20 and the work piece 300. In an example embodiment, the transition portion 114 includes at least one sloped portion 124, as shown in FIG. 4C, to connect the tool interface portion 112 to the blade interface portion 116 when the tool interface portion 112 and the blade interface portion 116 extend along different planes. For instance, the tool interface portion 112 extends at least predominately along a first plane P1 (represented by axis P1 in FIG. 4C) and the blade interface portion 116 extends along a second plane P2 (represented by axis P2 in FIG. 4C).

In an example embodiment, the blade 104 is integral with, connected to, or affixed to the coupling 102. In an example embodiment, the blade 104 is a cutting tool, which comprises stainless steel, tungsten carbide, brass, cobalt, metal, any suitable blade material, or any combination thereof. In an example embodiment, the blade 104 includes at least a first side 144 and a second side 146, which face in opposite directions. In addition, the blade 104 includes a plurality of edges including at least one cutting edge 142. For example, as shown in FIG. 6, the blade 104 includes a first edge 136, a second edge 138, a third edge 140, and a cutting edge 142. In an example embodiment, the first edge 136 is opposite to the second edge 138 while the third edge 140 is opposite to the cutting edge 142. In an example embodiment, the cutting edge 142 is sharp, serrated, abrasive, or any combination thereof. Also, in an example embodiment, the cutting edge 142 comprises any suitable shape or profile. For example, in FIG. 4A, the cutting edge 142 includes at least one linear portion. More specifically, in FIG. 4A, the cutting edge 142 includes teeth, which extend linearly along an axis 208. In an example embodiment, as shown in FIG. 4B, the cutting edge 142 is perpendicular or substantially perpendicular to the longitudinal axis 210 of the blade 104. In this regard, the cutting edge 142 may be substantially perpendicular to the longitudinal axis 210 of the blade 104 within tolerance of manufacture, tolerance of function, and/or the like.

In an example embodiment, the blade 104 includes suitable dimensions. For example, in an example embodiment, the blade 104 has at least a first width W1 and a second width W2. The first width W1 and the second width W2 can include similar dimensions or different dimensions. For example, in FIG. 4B, the first width W1 is less than the second width W2. In this regard, for instance, the first width W1 is adjacent to the third edge 140 and the second width W2 is adjacent to the cutting edge 142. This difference in widths (e.g., width W1 and width W2) is advantageous in providing material savings with respect to a non-cutting end portion of the blade 104 and providing a suitable cutting length at a cutting end portion of the blade 104.

In an example embodiment, the blade 104 includes the opening 148, as shown in FIGS. 5-6. In an example embodiment, the opening 148 is advantageous in reducing the mass, material, and cost of the blade 104. The opening 148 is also structured to influence a vibrational effect of the blade 104 and/or the blade accessory 100. In an example embodiment, the opening 148 is structured to receive at least a portion of the guide 106. In addition, the opening 148 is positioned on the blade 104 such that the guide 106 can be optimally positioned with respect to the cutting edge 142.

FIGS. 7, 8, 9A, 9B, 9C, 10A, 10B, and 10C illustrate the guide 106 according to an example embodiment. In an example embodiment, the guide 106 includes the guide member 166. In an example embodiment, the guide member 166 includes at least one guide surface 168 that is structured to reside on at least one side of the blade 104. For instance, as shown in FIG. 4C, when the guide 106 is attached to the blade accessory 100, the guide surface 168 is disposed on a first side 144 of the blade 104. In an example embodiment, as shown in FIG. 4C, the guide surface 168 extends along a third plane P3 (represented by axis P3 in FIG. 4C), which is perpendicular to (or substantially perpendicular to) the first plane P1 (represented by axis P1 in FIG. 4C) and/or the second plane P2 (represented by axis P2 in FIG. 4C). In this regard, the guide surface 160 may be substantially perpendicular to the first plane P1 and/or the second plane P2 within tolerance of manufacture, tolerance of function, and/or the like. In an example embodiment, the guide surface 168 is angled with respect to the cutting edge 142 of the blade 104 to optimize a cutting operation of the blade 104 with respect to the work piece 300. For example, as shown in FIG. 4A, the guide surface 168 forms an acute angle θ with the cutting edge 142. More specifically, as shown in FIG. 4A, the acute angle θ is formed between the guide surface 168, which extends along the axis 206, and the cutting edge 142, which extends along the axis 208.

In an example embodiment, the guide surface 168 is structured to move along and interact with a corresponding surface of the work piece 300. In this regard, for example, the guide surface 168 includes a relatively flat or smooth surface. In addition, the guide surface 168 is structured to support the blade 104 such that the blade 104 is enabled to cut the work piece 300 while maintaining an orientation of the cutting edge 142 with respect to the work piece 300. In this regard, for instance, the guide surface 168 is rigid and structured to prevent the blade 104 from sinking, popping-out, flexing, or performing any undesirable action when performing the desired cutting operation, e.g. a straight/linear cut along the work piece 300.

In an example embodiment, the guide 106 comprises metal, plastic, a composite material, any suitable material, or any combination thereof. Also, the guide 106 can include a coating that is configured to reduce friction and facilitate a movement of at least the guide surface 168 along at least a corresponding surface of the work piece 300. In an example embodiment, the guide 106 includes a material that is the same as a material of the blade 104, the coupling 102, or both the blade 104 and the coupling 102. Alternatively, in an example embodiment, the guide 106 includes a material that is different than a material of the blade 104, the coupling 102, or both the blade 104 and the coupling 102.

In an example embodiment, the guide 106 is attachable and detachable from the coupling 102, the blade 104, or both the coupling 102 and the blade 104. In an example embodiment, the guide 106 includes one or more separate and/or distinct parts that are configured to provide a secure attachment and an easy detachment from the coupling 102, the blade 104, or both the coupling 102 and the blade 104. For example, in FIGS. 7-8, the guide 106 includes a first part 108 and a second part 110, which are configured to provide a locked state and an unlocked state with respect to each other. In the locked state, the first part 108 and the second part 110 are secured to each other. Also, in the locked state, the first part 108 and the second part 110 are configured to be secured to the blade accessory 100. Alternatively, in the unlocked state, the first part 108 and the second part 110 are not secured to each other, thereby being detached, free, and movable with respect to each other. Also, in the unlocked state, the first part 108 and the second part 110 are not secured to the blade accessory 100, thereby being detached, free, and movable with respect to the blade accessory 100.

Figure 9A:
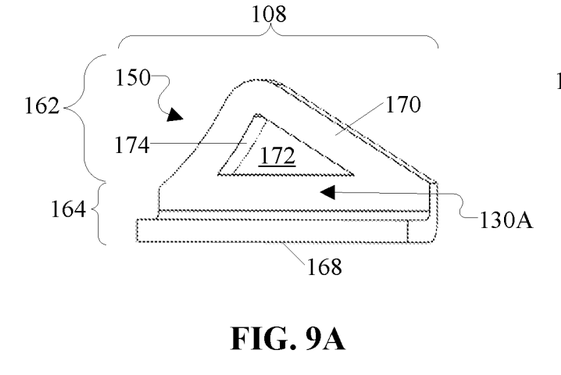
FIG. 9A is a perspective view of a first side of a first part of a guide according to an example embodiment of this disclosure.
Figure 9B:
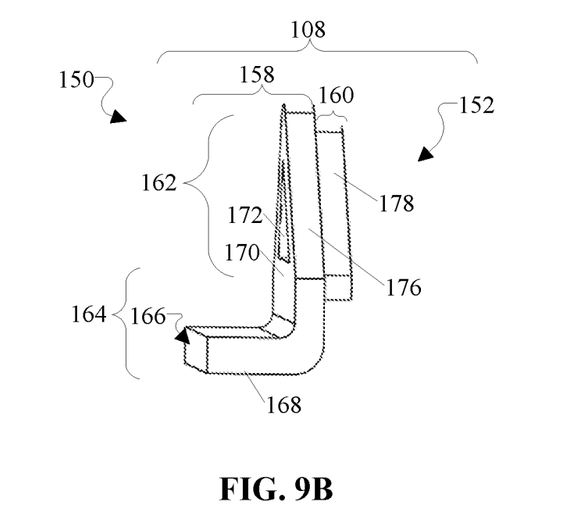
FIG. 9B is a side view of the first part of the guide according to an example embodiment of this disclosure.
Figure 9C:
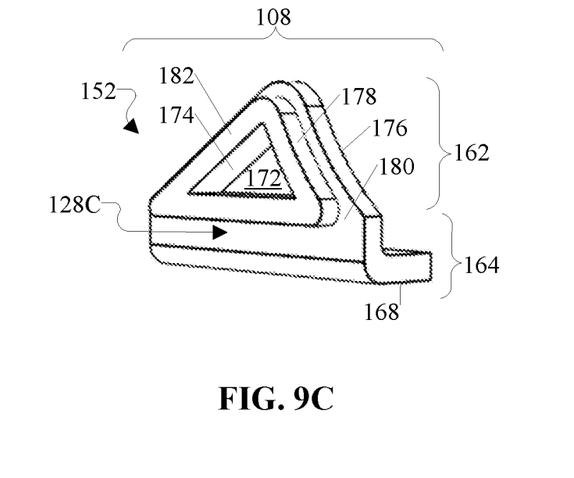
FIG. 9C is a perspective view of a second side of the first part of the guide according to an example embodiment of this disclosure.

In an example embodiment, as shown in FIG. 9B, the first part 108 includes at least a guide portion 158 and a first connecting portion 160. In an example embodiment, the guide portion 158 includes the guide member 166 on a first side 150 of the first part 108. More specifically, in FIGS. 9A-9C, for instance, the guide portion 158 comprises a first component 162 (e.g. a substantially triangular shaped component based on one cross-sectional view) and a second component 164 (e.g., a substantially L-shaped component based on another cross-sectional view). In this regard, the first component 162 and the second component 164 may be substantially shaped as a triangular shaped component and an L-shaped component in accordance within tolerance of manufacture, tolerance of function, and/or the like. In FIGS. 9A-9C, the first component 162 and the second component 164 are integrally formed as a monolithic structure. Alternatively, in another example embodiment (not shown), the first component 162 and the second component 164 are separate structures that are connected to each other in a secure and/or seamless manner.

In an example embodiment, the first component 162 has a shape that enables the guide surface 168 to be optimally positioned in relation to the cutting edge 142. For example, in FIGS. 9A-9C, as a cross-section, the first component 162 comprises a triangle or triangle-like shape (e.g., a scalene triangle) with rounded vertices or corner portions. In this example, the rounded vertices or corner portions are advantageous in handling the stress and vibrations of the blade accessory 100 when driven by the oscillating tool 20. Also, among sides of a cross-section of the first component 162, the first component 162 has a longest side 130A on which the guide member 166 and guide surface 168 are positioned. In this regard, the longest side 130A of the first component 162 is the longest side of the scalene triangle shape of the first component 162. This feature is advantageous in enabling the guide member 166 and guide surface 168 to be a suitable length for guiding the blade accessory 100. The guide surface 168 is structured to extend partly, fully, or beyond a dimension of the longest side 130A. In FIGS. 9A-9C, for instance, the guide surface 168 extends along a full length of the longest side 130A.

In an example embodiment, the second component 164 includes the guide member 166 along with the guide surface 168. For example, in FIGS. 9A-9C, as a cross-section, the second component 164 is L-shaped. One part of the L-shape is integral or connected to one side of the first component 162. Another part of the L-shape includes the guide member 166. With this L-shaped configuration, the guide member 166 protrudes outward and perpendicular (or substantially perpendicular) to at least first surface 170 and/or a second surface 180 of the first component 162. In this regard, the guide surface 166 may be substantially perpendicular to at least the first surface 170 and/or the second surface 180 of the first component 162 within tolerance of manufacture, tolerance of function, and/or the like.

In an example embodiment, the first connecting portion 160 is structured to connect with the second part 110. Also, in an example embodiment, when connected with the second part 110, the first connecting portion 160 is structured to connect to and provide a locked state with the coupling 102, the blade 104, or both the coupling 102 and the blade 104. In this regard, the first connecting portion 160 is on a second side 152 of the first part 108. In an example embodiment, the first connecting portion 160 extends from a second surface 180 of the guide portion 158. In an example embodiment, the first connecting portion 160 has a frame-like structure. For example, in FIG. 9C, the first connecting portion 160 is shown as a triangular frame with an opening 172. In an example embodiment, the first connecting portion 160 is structured to mate with the second connecting portion 190 of the second part 110. In an example embodiment, the frame-like structure of the first connecting portion 160 is configured to surround the second connecting portion 190 of the second part 110. In an example embodiment, the frame-like structure of the first connecting portion 160 is configured to contact or abut against corresponding parts of the first surface 192 on a first side 154 of the second part 110.

In an example embodiment, the first connecting portion 160 is structured to engage with the blade accessory 100. In an example embodiment, the first connecting portion 160 includes outer sidewalls 178 that are structured to engage with sidewalls 184 (FIG. 6) of the coupling 102 that define the opening 132 in the coupling 102. In addition, the outer sidewalls 178 are structured to engage with sidewalls 186 (FIG. 6) of the blade 104 that define the opening 148 in the blade 104. In an example embodiment, the outer sidewalls 178 of the first connecting portion 160 have a thickness that is substantially the same as, similar to, or slightly greater than a combined thickness of corresponding portions of the blade 104 and the coupling 102. In an example embodiment, the first connecting portion 160 includes the through-hole 172, which is structured to mate with the second connecting portion 190 of the second part 110.

Figure 7:
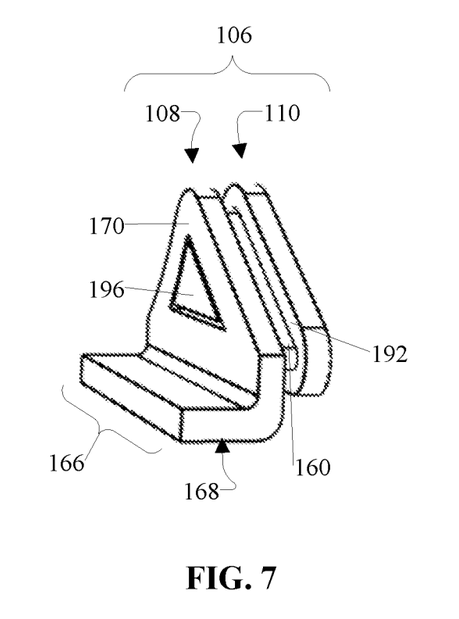
FIG. 7 is a view of a guide in a locked state according to an example embodiment of this disclosure.
Figure 8:
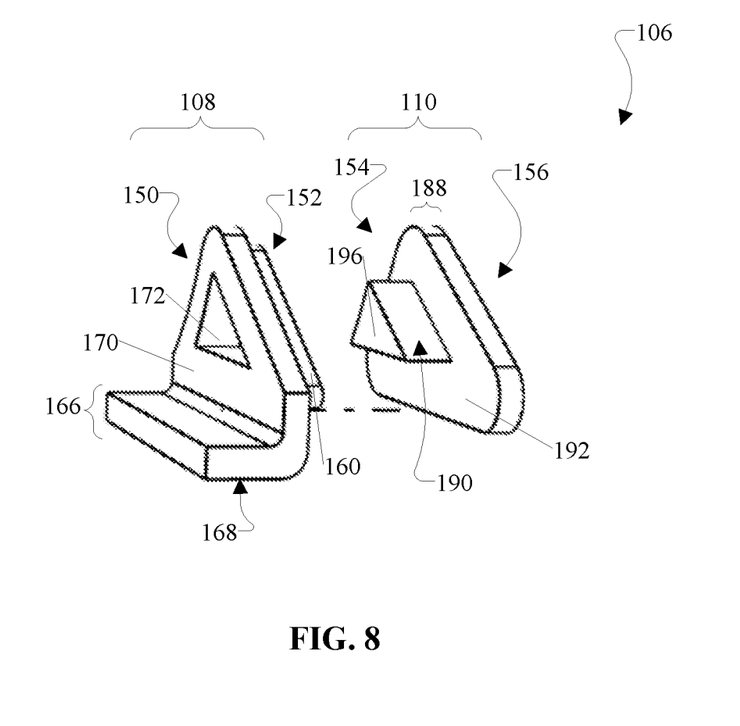
FIG. 8 is a view of a guide in an unlocked state according to an example embodiment of this disclosure.
Figure 10A:
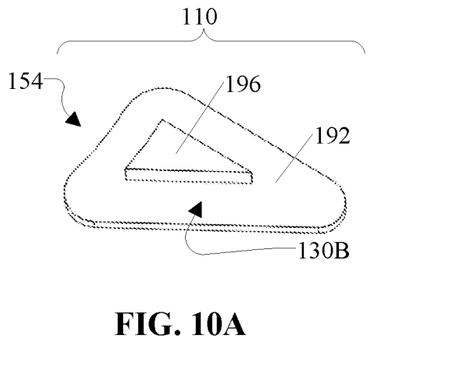
FIG. 10A is a perspective view of a first side of a second part of a guide according to an example embodiment of this disclosure.
Figure 10B:
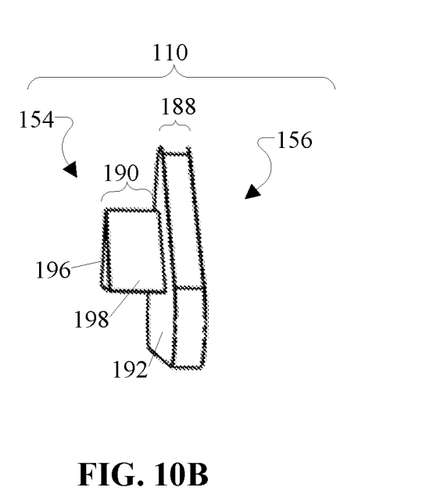
FIG. 10B is a side view of the second part of the guide according to an example embodiment of this disclosure.
Figure 10C:
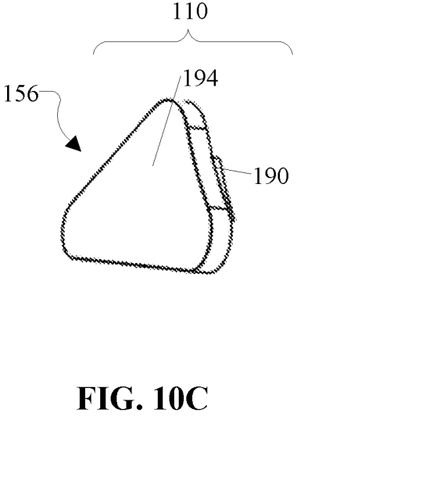
FIG. 10C is a perspective view of a second side of the second part of the guide according to an example embodiment of this disclosure.

In an example embodiment, the second part 110 is configured to be in a locked state and an unlocked state with the first part 108, as well as with the blade accessory 100 when attached to the blade accessory 100. In an example embodiment, as shown in FIG. 10B, the second part 110 includes a base portion 188 and the second connecting portion 190. In an example embodiment, the base portion 188 is structured to be compatible with the first part 108, as shown, for instance, in FIG. 7. In this regard, the shape of the base portion 188 is substantially congruent with the shape of the first component 162 of the first part 108. For example, as shown in FIGS. 10A-10C, the second part 110 is substantially triangular shaped and similar to a shape of the first component 162. In an example embodiment, the base portion 188 includes a first surface 192 and a second surface 194. In an example embodiment, the first surface 192 is on a first side 154 of the second part 110 and the second surface 194 is on a second side 156 of the second part 110. In an example embodiment, the first surface 192 is in contact with a surface 182 of the first connecting portion 160 when the guide 106 is in the locked state, as shown in FIG. 7. In this regard, the first surface 192 serves as an abutment surface for the surface 182 of the first connecting portion 160 of the first part 108.

In an example embodiment, the second connecting portion 190 extends from the first surface 192 of the base portion 188. For example, as shown in FIGS. 10A and 10B, the second connecting portion 190 protrudes outward from an inner region of the first surface 192. In an example embodiment, the second connecting portion 190 is structured to mate with the first part 108, particularly the through-hole 172 in the first part 108. Also, in an example embodiment, the second connecting portion 190 has outer sidewalls 198 that engage with sidewalls 174 of the first part 108 that define the through-hole 172 in the first part 108, thereby providing a snap-fit engagement between the first part 108 and the second part 110 and establishing the locked state.

In an example embodiment, the second connecting portion 190 is configured to pass through the opening 132 in the coupling 102 and the opening 148 in the blade 104. As shown in FIG. 6, for example, the second connecting portion 190 is smaller than the opening 148 in the blade 104. Similarly, in this regard, the second connecting portion 190 is also smaller than an opening 132 in the coupling 102. Also, in an example embodiment, as shown in FIG. 7, when the second part 110 mates with and is in a locked state with the first part 108, a surface 196 of the second connecting portion 190 is exposed via the through-hole 172. In this regard, the second connecting portion 190 is configured to pass through the first connecting portion 160 of the first part 108. Also, the second connecting portion 190 is configured to pass at least partly or fully through the corresponding first component 162 of the guide portion 158. In this regard, for example, the second connecting portion 190 has a thickness that is at least similar to or equal to a thickness of the corresponding first connecting portion 160 and the corresponding first component 162. This feature is advantageous in providing a secure engagement between the first part 108 and the second part 110. In addition, this feature is advantageous in providing an easy disengagement between the first part 108 and the second part 110 by enabling access to at least the surface 196 of the second connecting portion 190 at the first side 150 of the first part 108 via the through-hole 172.

In an example embodiment, the guide 106 includes a number of features that ensure that the guide surface 168 is positioned correctly in relation to the blade accessory 100. For example, as aforementioned, the guide 106 includes a first part 108 and a second part 110, which are configured to connect with each other via the opening 132 in the coupling 102 and the opening 148 in the blade 104. Moreover, in an example embodiment, as shown in FIG. 6, each of the opening 132, the opening 148, the first part 108, and the second part 110 includes a scalene triangle or triangle-like shape as a cross-sectional shape. By having a scalene triangular shape, each of the opening 132, the opening 148, the first part 108, and the second part 110 are structured to fit and engage with each other when the longest side 130A of the first part 108, the longest side 126 of the sidewall 184 of the coupling 102, the longest side 128 of the sidewall 186 of the blade 104, and the longest side 130B of the second part 110 are aligned. As such, this feature ensures that the guide 106 attaches to the blade accessory 100 in a proper and safe manner for use with the cutting edge 142.

As described above, the blade accessory 100 provides a number of advantageous features, as well as benefits. For example, the blade accessory 100 includes the blade 104, which is structured to perform at least plunge cuts on the work piece 300. In addition, the blade accessory 100 is structured to include the guide 106, which enables a user to utilize this same blade 104 to perform long, straight cuts with ease and accuracy. In this regard, a user can quickly transition between two different types of cuts (e.g., plunge-cuts, straight cuts, etc.) without having to switch from one type of blade to another type of blade, or vice versa. That is, by merely adjusting an orientation of the blade 104 (and attaching/detaching the guide 106 if deemed necessary), a user is enabled to avoid the relatively time consuming and burdensome task of switching out the accessory of the oscillating tool 20 to perform different types of cuts.

Furthermore, as another benefit, the guide 106 is structured to support the blade accessory 100 in relation to the work piece 300, thereby preventing the blade 104 from sinking into or popping out of the work piece 300 in a manner that could damage the blade 104, the work piece 300, or both the blade 104 and the work piece 300. This support feature of the guide 106 is advantageous in maintaining the blade 104 at an appropriate cutting position along the work piece 300. In addition, the guide 106 is also advantageous in ensuring that the cutting edge 142 is oriented at an optimal angle in relation to the work piece 300. That is, with the guide 106, the blade accessory 100 is enabled to perform at least long, linear cuts with accuracy and ease. Moreover, the guide 106 can be detached from the blade accessory 100 with ease for replacement, cleaning, disuse, etc. Moreover, the guide 106 is not limited to use with the blade accessory 100, but can also be used with or applied to other suitable accessories (not shown) provided that these other accessories are compatible with and structured to receive the guide 106 in a secure manner.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. An accessory for a power tool, the accessory comprising:
   a blade with a cutting edge;
   a coupling including a first portion that is attachable to and detachable from the power tool and a second portion that is connected to the blade; and a guide including (i) a first part having a first connecting portion and a guide portion, the guide portion including a guide member configured to guide the blade along a work piece by interacting with a surface of the work piece as the blade moves in an advancing direction, and (ii) a second part having a second connecting portion and a base portion, the second connecting portion protruding outward from the base portion, wherein, the guide is structured to provide (a) a locked state by establishing a connection between the first connecting portion and the second connecting portion such that the guide is attachable to the coupling and (b) an unlocked state between the first connecting portion and the second connecting portion such that the guide is detachable from the coupling; and the second portion of die coupling is asymmetrical with respect to a longitudinal axis of the blade and structured to engage with the first connecting portion and the second connecting portion.

2. The accessory of claim 1, wherein:

the guide member includes a guide surface that is configured to extend across a surface of the blade along a first axis and project outward from a surface of the guide along a second axis when in the locked state;

the cutting edge extends along a third axis that is perpendicular to the longitudinal axis; and the guide surface and the cutting edge are configured to be positioned at an acute angle relative to each other when taken along the first axis and the third axis.

3. The accessory of claim 1, wherein:

the guide is engaged with the blade when in the locked state; and the guide is disengaged from the blade when in the unlocked state.

4. The accessory of claim 1, wherein:

the blade includes a first opening;

the coupling includes a second opening;

the first connecting portion is structured to pass through the first opening and the second opening;

the second connecting portion is structured to pass through the first opening and the second opening; and the first connecting portion and the second connecting portion are configured to connect to each other through the first opening and the second opening.

5. The accessory of claim 4, wherein:

the first part is configured to reside on a first side of the blade, the second part is configured to reside on a second side of the blade, and the guide surface is configured to extend along a plane that is perpendicular or substantially perpendicular to a surface on the first side of the blade.

6. The accessory of claim 5, wherein:

the first part is in contact with the coupling; and the second part is in contact with the blade.

7. The accessory of claim 1, wherein:

a cross-section of the guide has a shape with a plurality of sides;

the cross-section of the guide has a longest side amongst the plurality of sides; and the guide surface extends from the longest side of the cross-section of the guide.

8. The accessory of claim 1, wherein:

the coupling is sandwiched between the first part and the blade;

the first portion of the coupling extends along a first plane;

the second portion of the coupling extends along a second plane;

the coupling includes a transition portion that extends between the first portion and the second portion; and the guide surface is configured to extend between the first plane and the second plane.

9. The accessory of claim 1, wherein the connection includes a snap-fit engagement between the first part and the second part to provide the locked state.

10. A power tool comprising:

a motor; and an accessory drivable by the motor, the accessory including:

a blade with a cutting edge;

a coupling including a first portion that is attachable to and detachable from the power tool and a second portion that is connected to the blade; and a guide including (i) a first part having a first connecting portion and a guide portion, the guide portion including a guide member configured to guide the blade along a work piece by interacting with a surface of the work piece as the blade moves in an advancing direction, and (ii) a second part having a second connecting portion and a base portion, the second connecting portion protruding outward from the base portion, wherein, the guide is structured to provide (a) a locked state by establishing a connection between the first connecting portion and the second connecting portion such that the guide is attachable to the coupling and (b) an unlocked state between the first connecting portion and the second connecting portion such that the guide is detachable from the coupling; and the second portion of the coupling is asymmetrical with respect to a longitudinal axis of the blade and structured to engage with the first connecting portion and the second connecting portion.

11. The power tool of claim 10, wherein:

the guide member includes a guide surface that is configured to extend across a surface of the blade along a first axis and project outward from a surface of the guide along a second axis when in the locked state;

the cutting edge extends along a third axis that is perpendicular to the longitudinal axis; and the guide surface and the cutting edge are configured to be positioned at an acute angle relative to each other when taken along the first axis and the third axis.

12. The power tool of claim 10, wherein:

the guide is engaged with the blade when in the locked state;

the guide is disengaged from the blade when in the unlocked state.

13. The power tool of claim 10, wherein:

the blade includes a first opening;

the coupling includes a second opening;

the first connecting portion is structured to pass through the first opening and the second opening;

the second connecting portion is structured to pass through the first opening and the second opening; and the first connecting portion and the second connecting portion are configured to connect to each other through the first opening and the second opening.

14. The power tool of claim 13, wherein:

the first part is configured to reside on a first side of the blade, the second part is configured to reside on a second side of the blade, and the guide surface is configured to extend along a plane that is perpendicular or substantially perpendicular to a surface on the first side of the blade.

15. The power tool of claim 14, wherein:

the first part is in contact with the coupling; and the second part is in contact with the blade.

16. The power tool of claim 10, wherein:

a cross-section of the guide has a shape with a plurality of sides;

the cross-section of the guide has a longest side amongst the plurality of sides; and the guide surface extends from the longest side of the cross-section of the guide.

17. The power tool of claim 10, wherein:

the coupling is sandwiched between the first part and the blade;

the first portion of the coupling extends along a first plane;

the second portion of the coupling extends along a second plane;

the coupling includes a transition portion that extends between the first portion and the second portion; and the guide surface is configured to extend between the first plane and the second plane.

18. The power tool of claim 10, wherein the connection includes a snap-fit engagement between the first part and the second part to provide the locked state.

* * * * *

UNITED STATES PATENT AND TRADEMARK OFFICE
CERTIFICATE OF CORRECTION

PATENT NO. : 10,906,108 B2  
APPLICATION NO. : 15/961271  
DATED : February 2, 2021  
INVENTOR(S) : Rubens et al.

Page 1 of 1

It is certified that error appears in the above-identified patent and that said Letters Patent is hereby corrected as shown below:

In the Claims

In Claim 1, at Column 11, Line 17: "of die coupling" should read --of the coupling--.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*